(12) United States Patent  (10) Patent No.: US 11,987,383 B2
Nielsen et al.  (45) Date of Patent: May 21, 2024

(54) LIGHTING APPARATUS FOR REMOTE CONTROLLED DEVICE

(71) Applicant: Snap Inc., Santa Monica, CA (US)

(72) Inventors: Simon Saito Nielsen, Beverly Hills, CA (US); Samy Kamkar, West Hollywood, CA (US)

(73) Assignee: Snap Inc., Santa Monica, CA (US)

( * ) Notice: Subject to any disclaimer, the term of this patent is extended or adjusted under 35 U.S.C. 154(b) by 7 days.

(21) Appl. No.: 17/821,776

(22) Filed: Aug. 23, 2022

(65) Prior Publication Data

US 2023/0059272 A1 Feb. 23, 2023

Related U.S. Application Data

(63) Continuation of application No. 16/452,026, filed on Jun. 25, 2019, now Pat. No. 11,427,349, which is a continuation of application No. 15/339,810, filed on Oct. 31, 2016, now Pat. No. 10,370,118.

(60) Provisional application No. 62/249,252, filed on Oct. 31, 2015.

(51) Int. Cl.
  *B64D 47/06* (2006.01)
  *B64C 39/02* (2023.01)
  *G05D 1/00* (2006.01)

(52) U.S. Cl.
  CPC ............ *B64D 47/06* (2013.01); *B64C 39/024* (2013.01); *G05D 1/0016* (2013.01)

(58) Field of Classification Search
  CPC .. B64D 47/06; B64D 2203/00; B64C 39/024; G05D 1/0016; B64U 2101/00; B64U 10/13
  See application file for complete search history.

(56) References Cited

U.S. PATENT DOCUMENTS

| 6,038,295 | A  | 3/2000  | Mattes       |
| 6,819,982 | B2 | 11/2004 | Doane        |
| 6,980,909 | B2 | 12/2005 | Root et al.  |
| 7,173,651 | B1 | 2/2007  | Knowles      |
| 7,411,493 | B2 | 8/2008  | Smith        |
| 7,535,890 | B2 | 5/2009  | Rojas        |
| 7,542,073 | B2 | 6/2009  | Li et al.    |
| 8,131,597 | B2 | 3/2012  | Hudetz       |
| 8,174,562 | B2 | 5/2012  | Hartman      |
| 8,199,747 | B2 | 6/2012  | Rojas et al. |
| 8,274,550 | B2 | 9/2012  | Steuart, III |
| 8,332,475 | B2 | 12/2012 | Rosen et al. |
| 8,646,720 | B2 | 2/2014  | Shaw         |

(Continued)

FOREIGN PATENT DOCUMENTS

CA 2887596 A1 7/2015

OTHER PUBLICATIONS

US 10,656,660 B1, 05/2020, Meisenholder et al. (withdrawn)

(Continued)

*Primary Examiner* — Brian P Sweeney

(74) *Attorney, Agent, or Firm* — Schwegman Lundberg & Woessner, P.A.

(57) ABSTRACT

There is a remote control device or drone, which has software and a combination of lights or LED on an lighting ring or apparatus that can move independently of the drone; the drone can be programmed or be reactive to sound or other stimulus to create the effect of writing shapes or words in the air and typically at nighttime against a dark sky.

19 Claims, 7 Drawing Sheets

(56) References Cited

U.S. PATENT DOCUMENTS

| | | | |
|---|---|---|---|
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,344,642 | B2 | 5/2016 | Niemi et al. |
| 9,345,711 | B2 | 5/2016 | Friedhoff |
| 9,443,227 | B2 | 9/2016 | Evans et al. |
| 9,471,059 | B1 | 10/2016 | Wilkins |
| 9,489,661 | B2 | 11/2016 | Evans et al. |
| 9,489,937 | B1 | 11/2016 | Beard et al. |
| 9,491,134 | B2 | 11/2016 | Rosen et al. |
| 9,576,369 | B2 | 2/2017 | Venkataraman et al. |
| 9,589,448 | B1 | 3/2017 | Schneider et al. |
| 9,681,046 | B2 | 6/2017 | Adsumilli et al. |
| 9,723,272 | B2 | 8/2017 | Lu et al. |
| 9,747,901 | B1 | 8/2017 | Gentry |
| 9,922,659 | B2 | 3/2018 | Bradlow et al. |
| 9,989,965 | B2 | 6/2018 | Cuban et al. |
| 10,061,328 | B2 | 8/2018 | Canoy et al. |
| 10,109,224 | B1* | 10/2018 | Ratti .................. G09G 3/005 |
| 10,140,987 | B2 | 11/2018 | Erickson et al. |
| 10,168,700 | B2 | 1/2019 | Gordon et al. |
| 10,370,118 | B1 | 8/2019 | Nielsen et al. |
| 10,501,180 | B2 | 12/2019 | Yu |
| 10,768,639 | B1 | 9/2020 | Meisenholder et al. |
| 11,126,206 | B2 | 9/2021 | Meisenholder et al. |
| 11,427,349 | B1 | 8/2022 | Nielsen et al. |
| 2007/0250526 | A1 | 10/2007 | Hanna |
| 2008/0255842 | A1 | 10/2008 | Simhi |
| 2009/0122133 | A1 | 5/2009 | Hartman |
| 2011/0202598 | A1 | 8/2011 | Evans et al. |
| 2012/0194420 | A1 | 8/2012 | Osterhout et al. |
| 2012/0209924 | A1 | 8/2012 | Evans et al. |
| 2012/0281885 | A1 | 11/2012 | Syrdal et al. |
| 2012/0287274 | A1 | 11/2012 | Bevirt |
| 2013/0056581 | A1 | 3/2013 | Sparks |
| 2013/0238168 | A1 | 9/2013 | Reyes |
| 2014/0254896 | A1 | 9/2014 | Zhou et al. |
| 2015/0022432 | A1 | 1/2015 | Stewart et al. |
| 2015/0070272 | A1 | 3/2015 | Kim et al. |
| 2015/0175263 | A1 | 6/2015 | Reyes |
| 2015/0199022 | A1 | 7/2015 | Gottesman et al. |
| 2015/0287246 | A1 | 10/2015 | Huston et al. |
| 2015/0331490 | A1 | 11/2015 | Yamada |
| 2015/0362917 | A1 | 12/2015 | Wang et al. |
| 2016/0063987 | A1 | 3/2016 | Xu et al. |
| 2016/0161946 | A1 | 6/2016 | Wuth Sepulveda et al. |
| 2016/0179096 | A1 | 6/2016 | Bradlow et al. |
| 2016/0292886 | A1 | 10/2016 | Erad et al. |
| 2016/0307573 | A1 | 10/2016 | Wobrock |
| 2016/0336020 | A1 | 11/2016 | Bradlow et al. |
| 2017/0031369 | A1 | 2/2017 | Liu et al. |
| 2017/0094259 | A1 | 3/2017 | Kouperman et al. |
| 2017/0099424 | A1 | 4/2017 | Jones |
| 2017/0102699 | A1 | 4/2017 | Anderson |
| 2017/0137125 | A1* | 5/2017 | Kales .................. B64C 27/10 |
| 2017/0177925 | A1 | 6/2017 | Volkart |
| 2017/0225796 | A1 | 8/2017 | Sun et al. |
| 2017/0228690 | A1 | 8/2017 | Kohli |
| 2017/0244937 | A1 | 8/2017 | Meier et al. |
| 2017/0320564 | A1 | 11/2017 | Kuzikov |
| 2017/0337791 | A1 | 11/2017 | Gordon-carroll |
| 2017/0371353 | A1 | 12/2017 | Millinger, III |
| 2018/0082682 | A1 | 3/2018 | Erickson et al. |
| 2018/0246529 | A1 | 8/2018 | Hu et al. |
| 2019/0011921 | A1 | 1/2019 | Wang et al. |
| 2020/0241575 | A1 | 7/2020 | Meisenholder et al. |
| 2021/0362848 | A1 | 11/2021 | Spencer |
| 2021/0382503 | A1 | 12/2021 | Meisenholder et al. |

OTHER PUBLICATIONS

"U.S. Appl. No. 15/339,810, Non Final Office Action dated Sep. 7, 2018", 5 pgs.

"U.S. Appl. No. 15/339,810, Notice of Allowance dated Mar. 21, 2019", 7 pgs.

"U.S. Appl. No. 15/339,810, Response filed Feb. 7, 2019 to Non Final Office Action dated Sep. 7, 2018", 7 pgs.

"U.S. Appl. No. 15/339,810, Response filed Jul. 17, 2018 to Restriction Requirement dated May 16, 2018", 7 pgs.

"U.S. Appl. No. 15/339,810, Restriction Requirement dated May 16, 2018", 5 pgs.

"U.S. Appl. No. 16/452,026, 312 Amendment filed Jul. 15, 2022", 6 pgs.

"U.S. Appl. No. 16/452,026, Final Office Action dated Apr. 21, 2021", 14 pgs.

"U.S. Appl. No. 16/452,026, Non Final Office Action dated Sep. 13, 2021", 12 pgs.

"U.S. Appl. No. 16/452,026, Non Final Office Action dated Nov. 13, 2020", 16 pgs.

"U.S. Appl. No. 16/452,026, Notice of Allowance dated Apr. 15, 2022", 8 pgs.

"U.S. Appl. No. 16/452,026, Preliminary Amendment filed Jan. 2, 2020", 7 pgs.

"U.S. Appl. No. 16/452,026, PTO Response to Rule 312 Communication dated Jul. 27, 2022", 2 pgs.

"U.S. Appl. No. 16/452,026, Response filed Feb. 28, 2022 to Non Final Office Action dated Sep. 13, 2021", 10 pgs.

"U.S. Appl. No. 16/452,026, Response filed Apr. 13, 2021 to Non Final Office Action dated Nov. 13, 2020", 8 pgs.

"U.S. Appl. No. 16/452,026, Response filed Aug. 23, 2021 to Final Office Action dated Apr. 21, 2021", 11 pages.

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr, Shokoofeh, et al., "You two! Take off!: Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

* cited by examiner

Fig. 5a Outline of drone persistence of vision communication
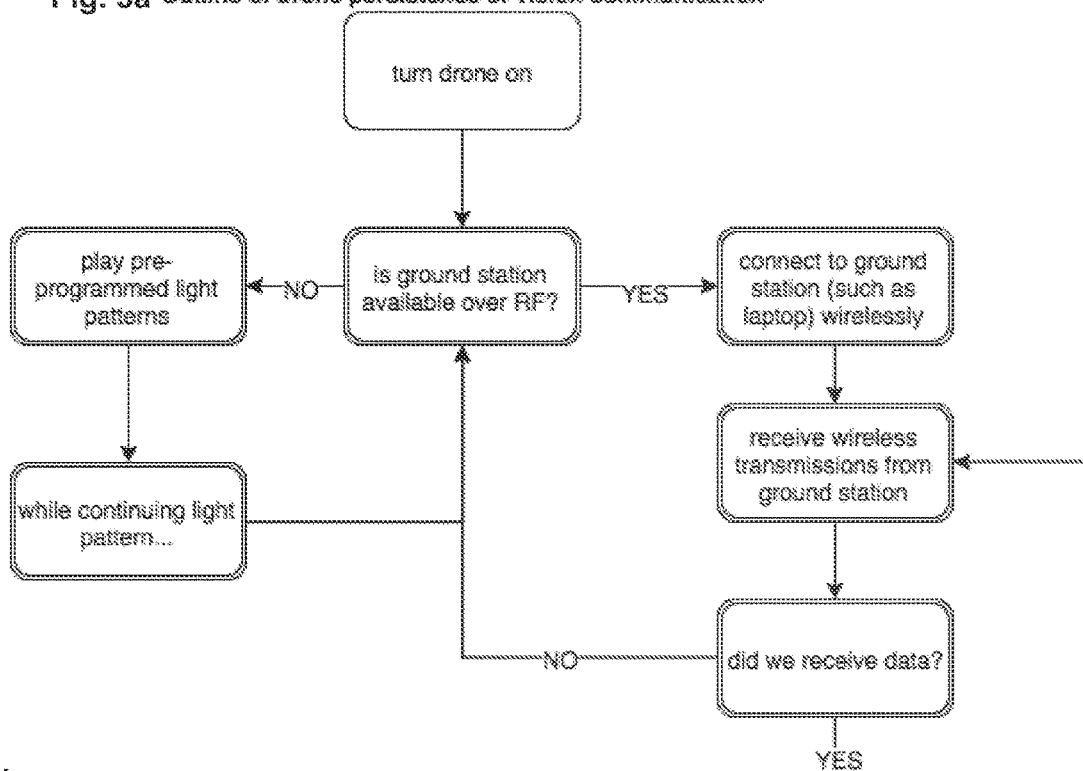
Fig. 5b
Wireless signal handling on drone
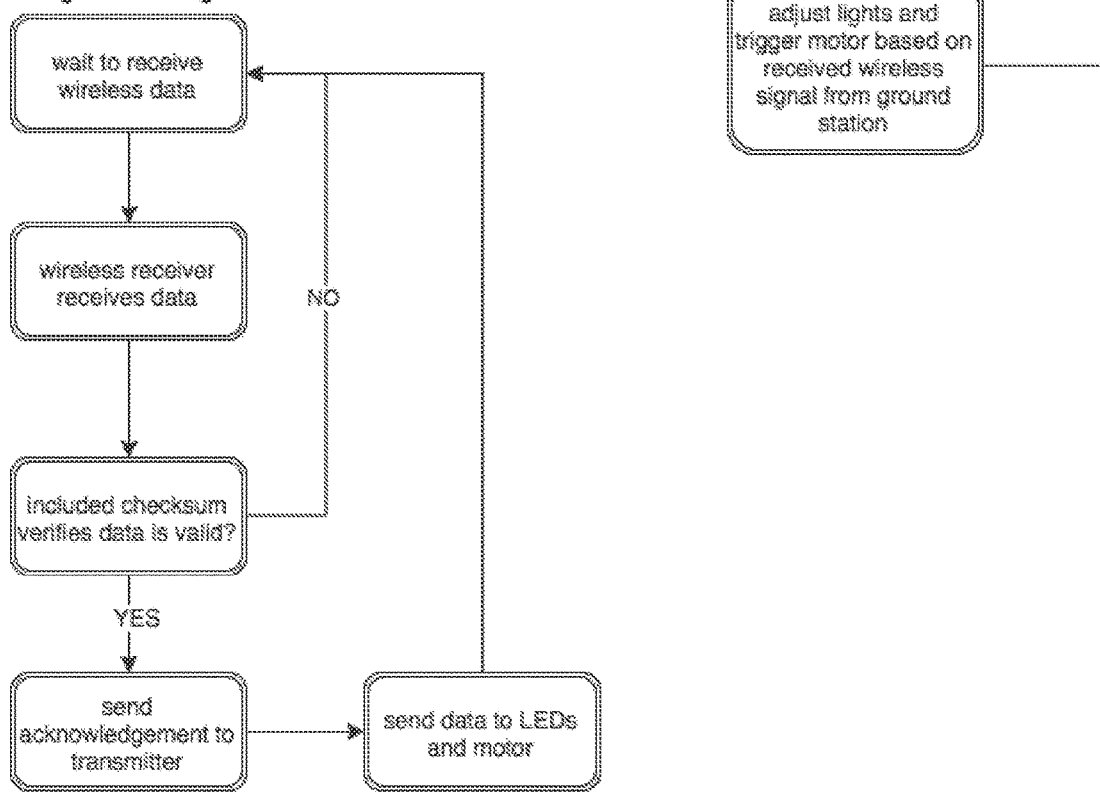

LIGHTING APPARATUS FOR REMOTE CONTROLLED DEVICE

PRIORITY CLAIM

This application is a continuation of and claims the benefit of U.S. patent application Ser. No. 16/452,026, filed Jun. 25, 2019, which is a continuation of and claims the benefit of U.S. patent application Ser. No. 15/339,810, filed Oct. 31, 2016, which claims the benefit of U.S. Provisional Patent Appl. No. 62/249,252, filed on Oct. 31, 2015, which are incorporated by reference in their entirety.

BACKGROUND OF THE INVENTION

1. Field of the Invention

This invention relates to using Light Emitting Diodes (LED) lights with remote controlled devices.

2. Description of Related Art

Prior to the present invention, remote controlled devices or drones used and employed lights and cameras; however, none used a combination of lights (typically LED-type lights) in a cycling motion and software that is reactive to sound to create the effect of writing words in the air and typically at nighttime against a dark sky. Prior devices simply turned lights on or off to mimic independent movement.

From the preceding descriptions, it is apparent that the devices currently being used have significant disadvantages. Thus, important aspects of the technology used in the field of invention remain amenable to useful refinement.

SUMMARY OF THE INVENTION

There is a remote control flying device or drone, which has software algorithms and a combination of lights or LED on an lighting ring or apparatus that can move independently of the drone; the drone can be programmed or be reactive to sound or other stimulus (light, motion, temperature) to create the effect of writing shapes or words in the air and typically at nighttime against a dark sky.

An apparatus for presenting LED lighting on a drone, said drone having a drone frame, at least one drone motor and at least one rotating blade; a battery; a LED microcontroller; a wireless receiver; an electronic speed controller; a first flight controller; said apparatus for presenting LED lighting comprising:

the drone frame having a first drone frame arm and a second drone frame arm;
the first drone frame arm having an LED ring motor;
the second drone frame arm having a bearing;
a LED housing has at least one LED light and engages the drone frame arms via the bearing and the LED ring motor, whereby the bearing allows the LED Ring Motor to move the LED housing around an axis of the drone frame and independently of movement of the drone and wherein in low light conditions and when the LED housing is moving independently around the drone, the at least one LED light creates a persistence of vision such that the drone is invisible in relation to the at least one LED light.

The drone frame can have multiple arms; each arm can have at least one drone motor, the at least one rotating blade, servo or bearing. The LED housing can be translucent and circular, square rectangular or triangular in shape. The drone is wirelessly connected to a second flight controller or a ground control computing device, which is a computing device with wireless communication and audio and visual inputs and can direct the LED lights to activate, for the LED Ring Motor to active to move the LED housing and to operate the first flight controller of the drone. The additional flight controller can be a smartphone, tablet or laptop computer; the audio input is a microphone; the visual input can be a light or thermal heat sensor.

A method of creating a persistence of vision display using a drone, an apparatus for presenting LED lighting and a ground station computing device with a wireless communication system; said drone having a drone frame, at least one drone motor and at least one rotating blade; a battery; a LED microcontroller; a wireless receiver; an electronic speed controller; a first flight controller; said apparatus for presenting LED lighting comprising:

the drone frame having a first drone frame arm and a second drone frame arm;
the first drone frame arm having an LED ring motor;
the second drone frame arm having a bearing;
a LED housing has at least one LED light and engages the drone frame arms via the bearing and the LED ring motor, whereby the bearing allows the LED Ring Motor to move the LED housing around an axis of the drone frame and independently of movement of the drone, comprising the following steps:

a. Activating the drone;
b. Signaling for the ground station computing device;
c. If the ground station computing device communicates with the drone and the LED microcontroller and transmits wireless instructions to the drone and the LED microcontroller to activate and adjust the at least one LED light and the LED housing and position of the drone.
d. If the ground station computing device does not communicate with the drone and the LED microcontroller, the drone and the LED microcontroller commences a pre-programmed light pattern and drone movement, whereby the at least one LED light and the LED housing create the persistence of vision display to a viewer.

The present invention introduces such refinements. In its preferred embodiments, the present invention has several preferred aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIGS. 5a and 5b show flowcharts of one embodiment of the algorithm for the "Hoop Drone" or "Persistence of Vision Communication" system.

PARTS LIST

Figure 1:
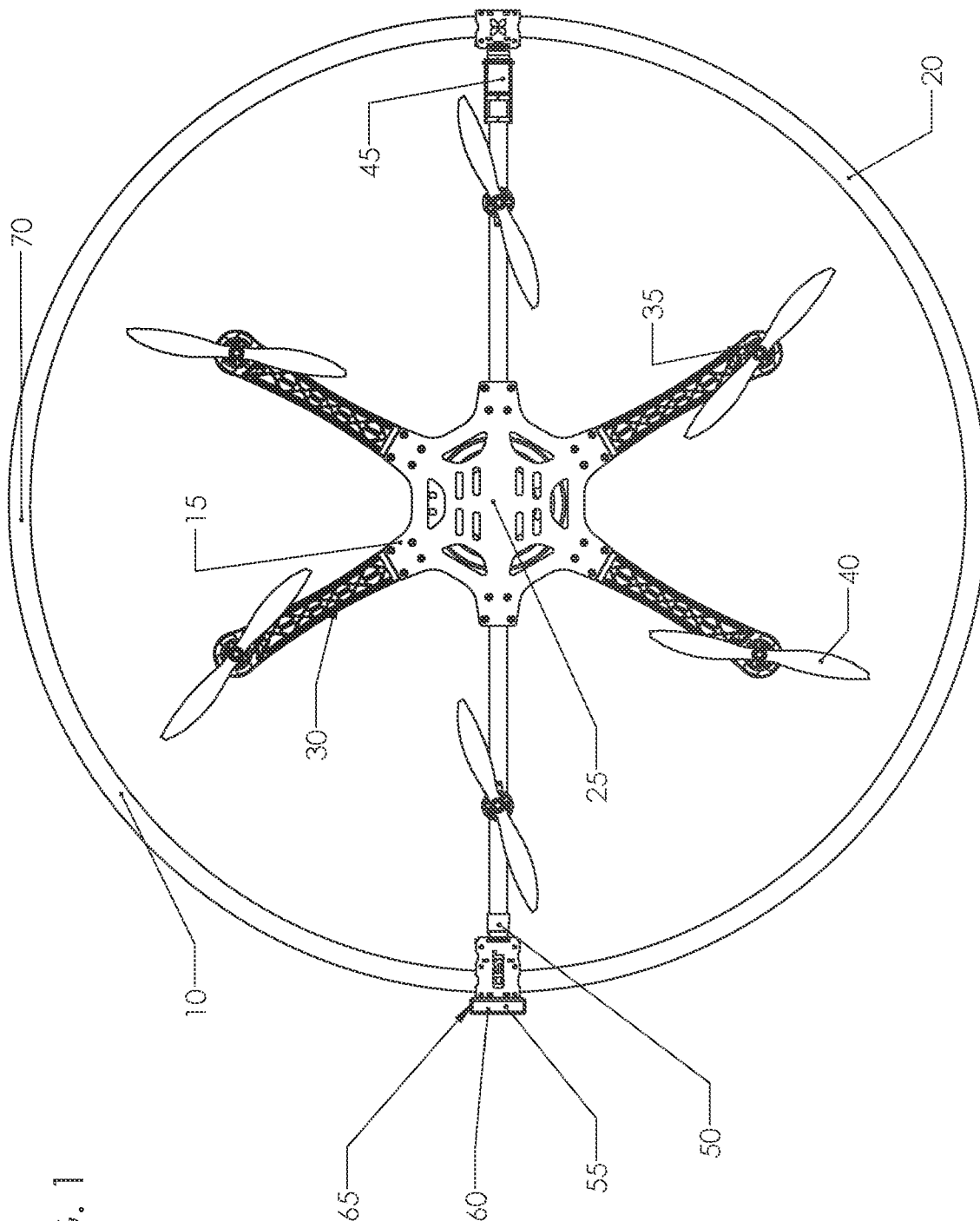
FIG. 1-4 show various views of one embodiment of the invention, which shows an overview of the rotating light apparatus on the drone.
Figure 2:
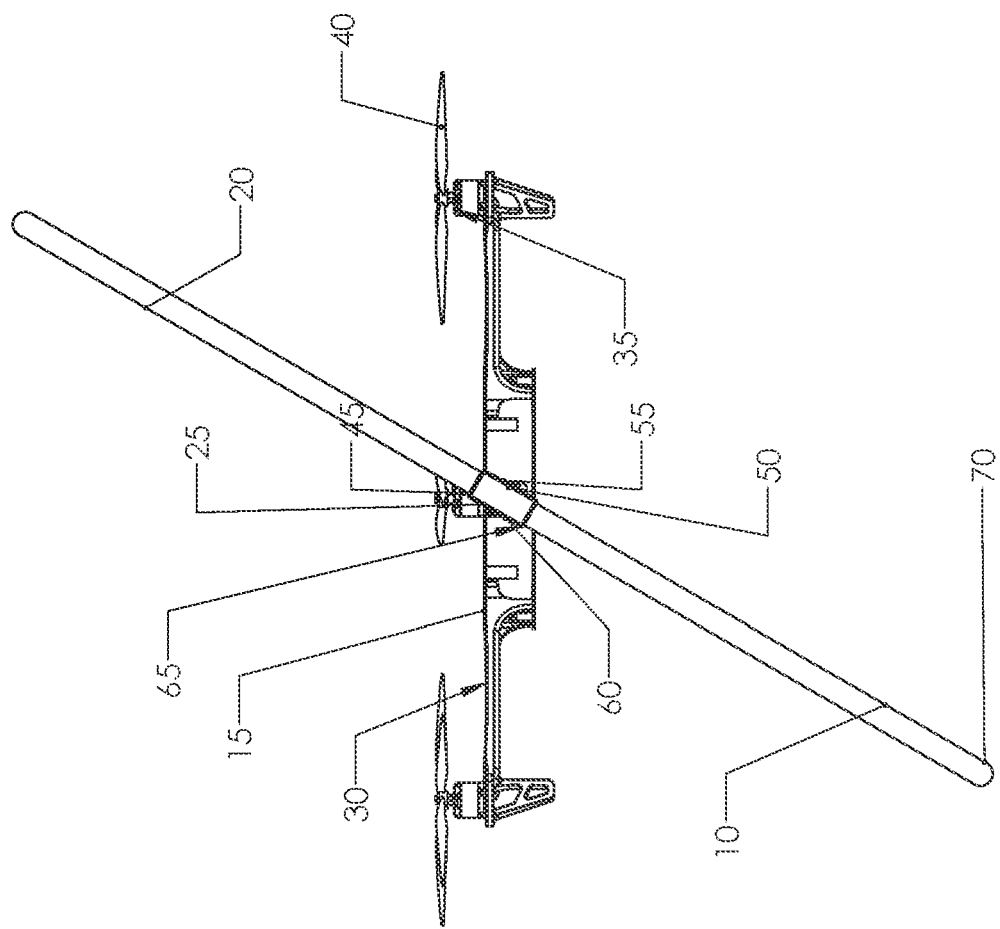
Figure 3:
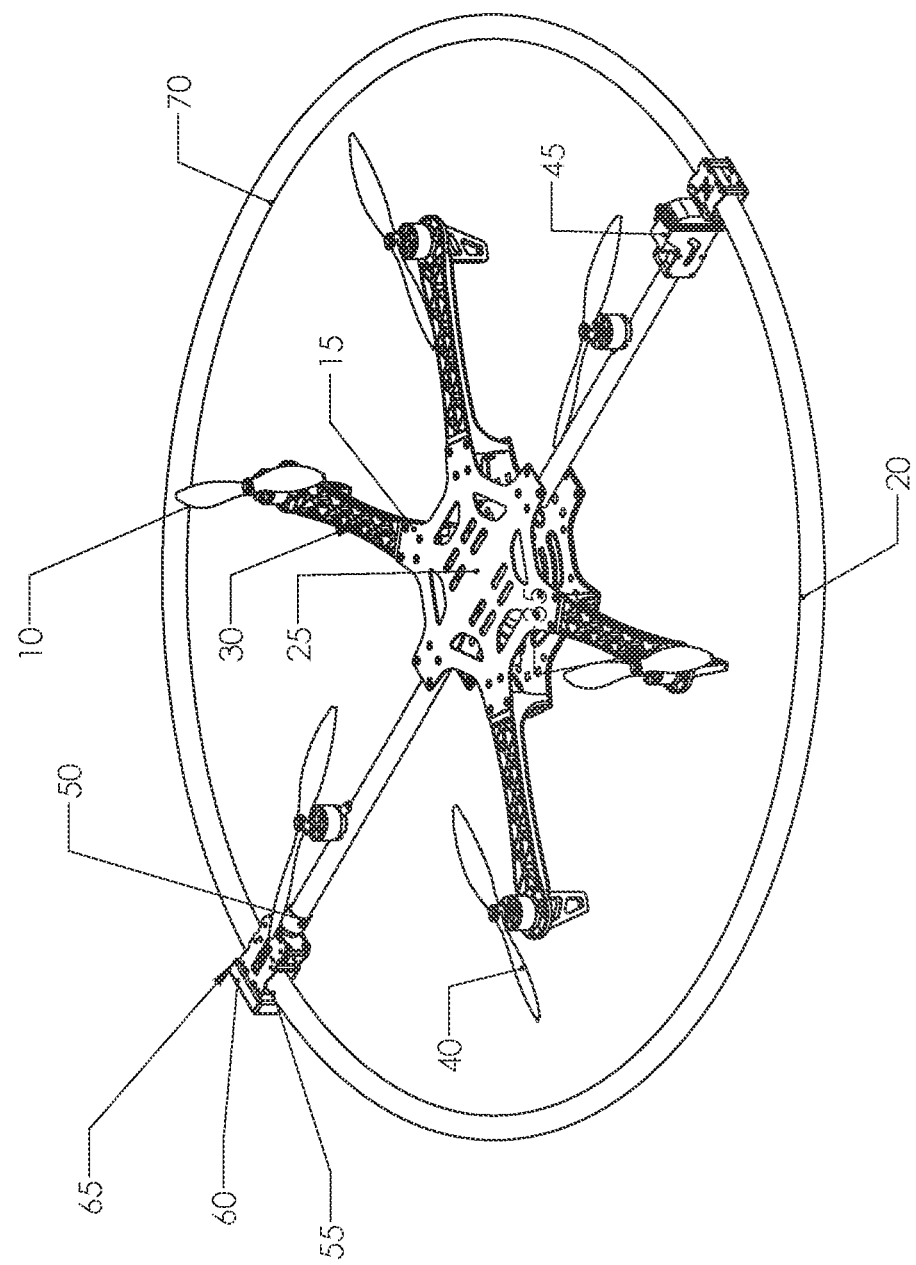
Figure 4:
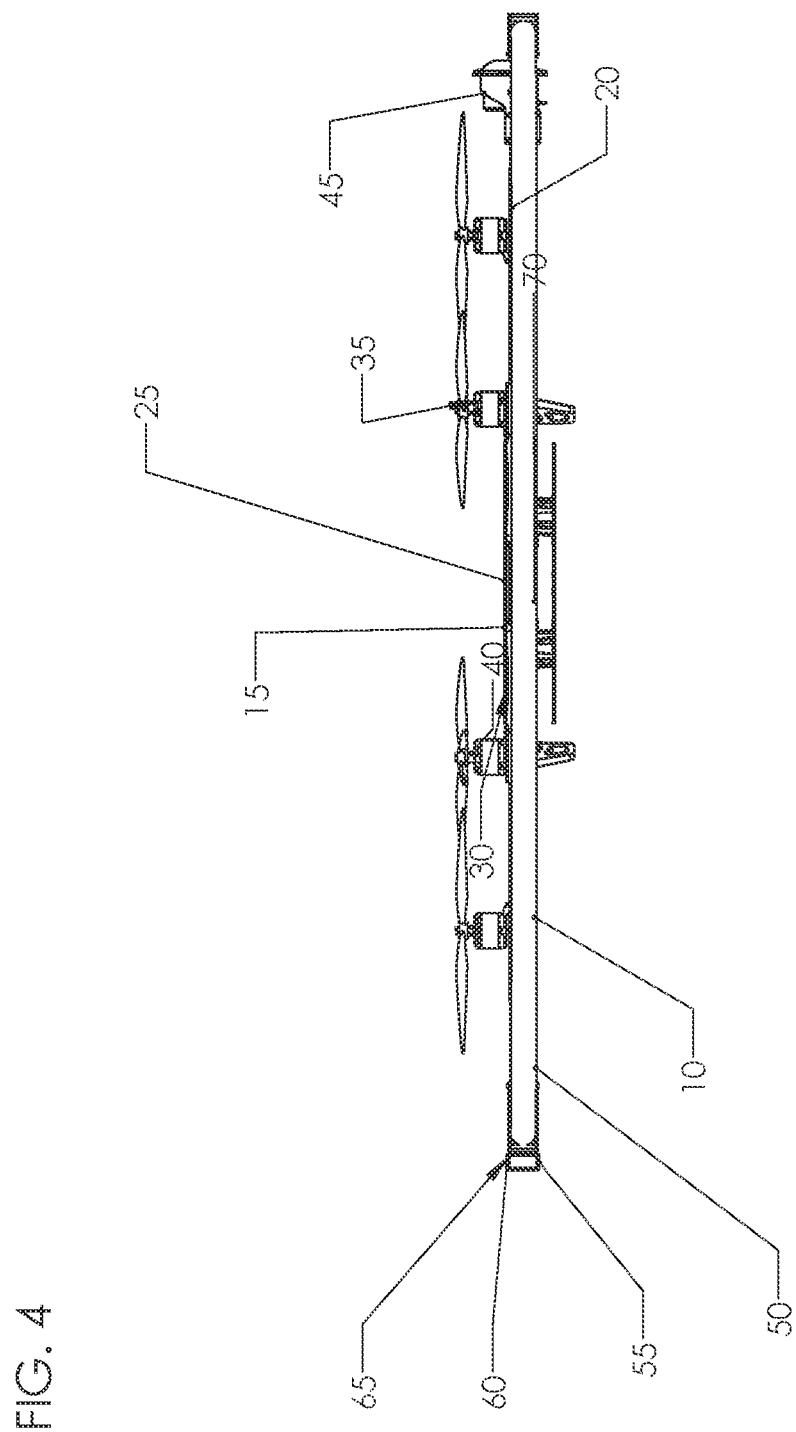

10 Apparatus
15 Frame for Drone
20 Outer Ring for LED; LED housing
25 Flight Controller
30 ESC
35 Drone Motor
40 Propeller
45 LED Ring Motor
50 Bearing or Servo
55 Battery
60 Microcontroller; LED microcontroller computing device
65 Wireless Receiver
70 LED light or light

DESCRIPTION OF THE PREFERRED EMBODIMENTS

The Basic Drone Apparatus includes without limitation: a drone frame or housing; at least one drone motor and at least one rotating blade or fan; a battery; a computing device or computing control device or flight controller; antenna; electronic speed controllers or sensors; stabilizers; gyroscope; altimeter; accelerometer and magnetometer; and a wireless receiver. The drone frame can have at least one or multiple arms, which each can have a drone motor and propeller; the drone frame and/or arms can also have lights or LED lights. Some of the electronic components or sensors can be combined into a computing device on the drone itself or be placed on different parts of the apparatus (LED housing, drone arms or drone frame). All of the electronics, LED lights, batteries on the drone or LED housing can be connected with wiring.

Lighting Apparatus Embodiment

One preferred embodiment of the invention presents a circular or ring shaped light mounting structure on the drone apparatus, which moves independently and separately from the drone itself. There is a moving frame or ring of LED lights; LED lights can be programmed to react to an external stimulus (sound, light, etc.) or a programmed stimulus (music, light pattern). Separate motors, servos and bearings allow the light mounting apparatus on the drone apparatus to spin or to move independently from the drone itself. This invention employs software programs and algorithms to activate said lights and the drone apparatus. RF is radio frequency or any other wireless communication format; laptop refers to any computing device, including Smart Phone, laptop, tablet, notebook or any other mobile or desktop computing device.

Lighting or LED Housing

The drone frame can have multiple drone arms, including a first drone frame arm and a second drone frame arm. The first and the second drone arms can be connected to the lighting or LED housing. The first or second drone arms can have at least one or more LED frame motors, servos or bearings.

The LED housing has at least one LED light and engages the drone frame arms via the bearing and the LED ring motor, whereby the bearing allows the LED Ring Motor to move the LED housing around an axis of the drone frame and independently of movement of the drone. LED lights can be various colors: white, red, blue, etc.

The housing can be made of any lightweight plastic material, including clear, transparent or opaque colors; the housing can be hollow, a rail or track (upon which the LED lights are disposed. The LED housing can be circular, square rectangular or triangular or any variable shape.

Wireless Connection and Control:

In one preferred embodiment, the applicants employ a wireless control of not only the drone's flying motors and flight system, but also the LED lights, including without limitation use of a wireless Arduino LED Control system.

In low light conditions and when the LED housing is moving independently around the drone, the at least one LED light or lights on the rotating LED housing create a persistence of vision such that the drone is generally or basically shadowed or invisible in relation to the at least one LED light or lights. The display of a rapidly rotating LED light housing around a stationary or moving drone creates a visually stimulating and pleasing sight.

The drone can be wirelessly connected to a second flight controller, which is a computing device with audio and visual inputs and can direct the LED lights to activate, for the LED Ring Motor to active to move the LED housing and to operate the first flight controller of the drone. Typical wireless communication is RF but can also include without limitation other wireless protocols: Bluetooth, WIFI, Satellite and cellular network communications.

The second flight controller can also be a Smartphone, tablet or laptop computer; the audio input can be a microphone; the visual input can be a light sensor or another type of electronic eye; other potential sensors could include heat and thermal sensors and GPS or position sensors.

a. Programmed to React to Stimuli (Music or Light, Etc.)

Figure 6B:
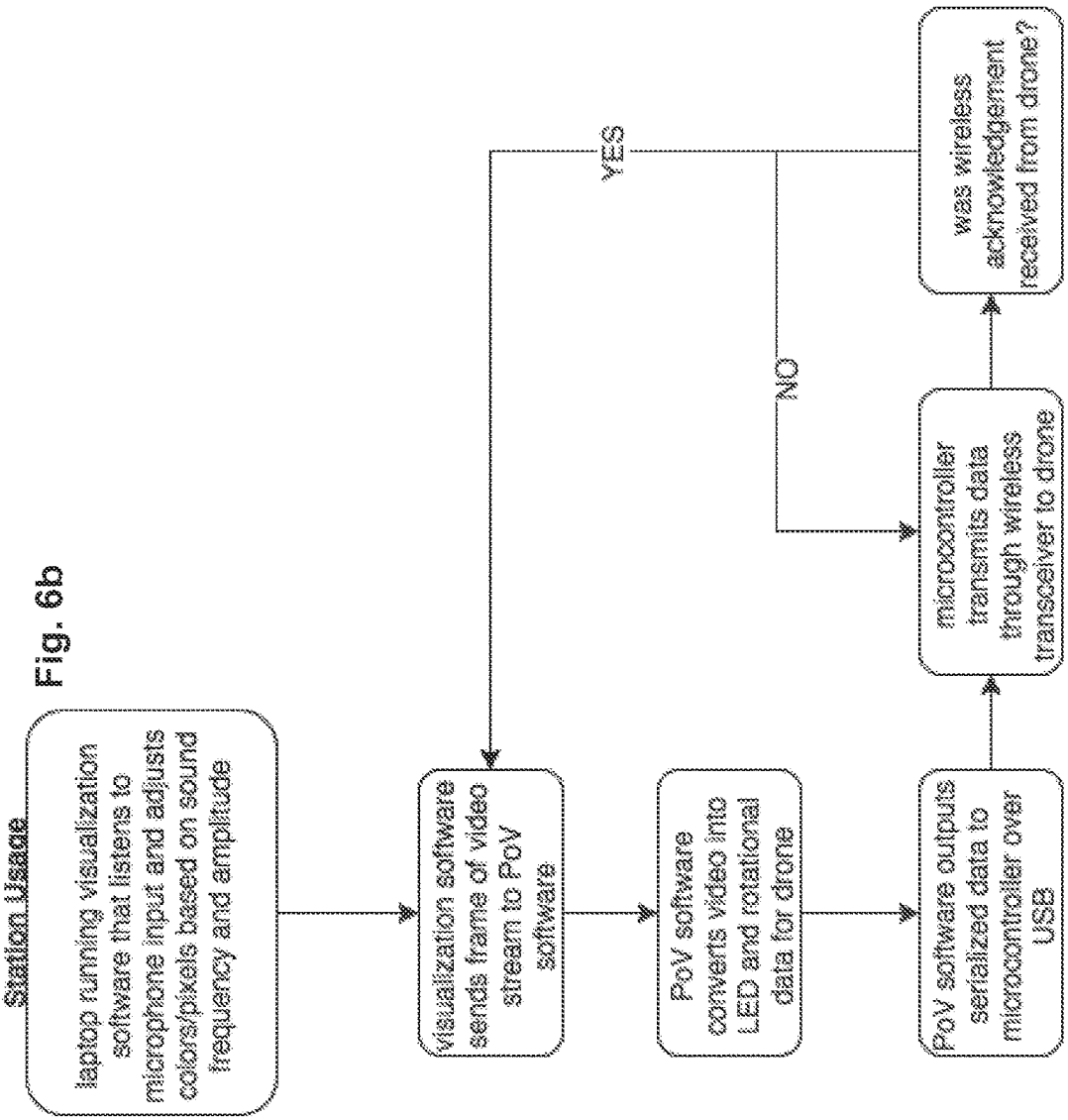
FIGS. 6a and 6b show flowcharts of one embodiment of the algorithm for the "Hoop Drone" or "Persistence of Vision Communication" system, namely the Ground Station algorithm or software.
Figure 6A:
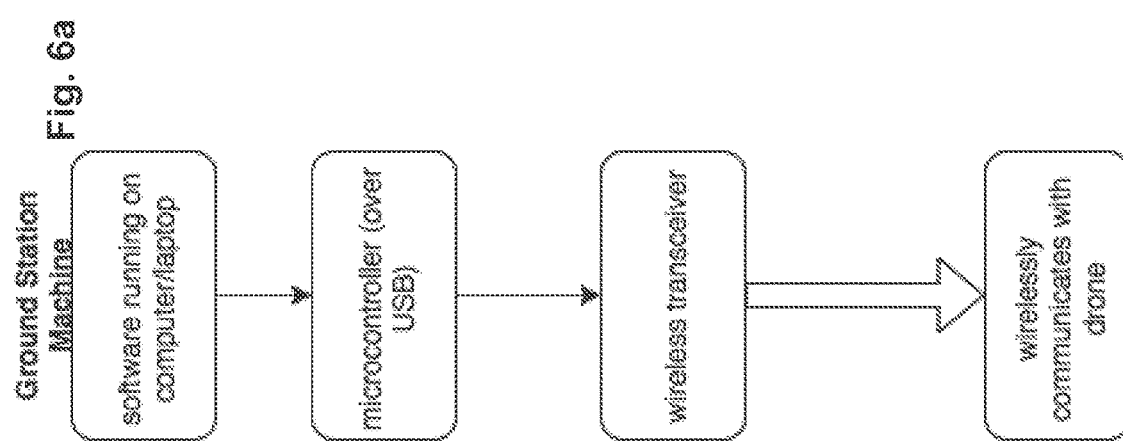
Figure 7:
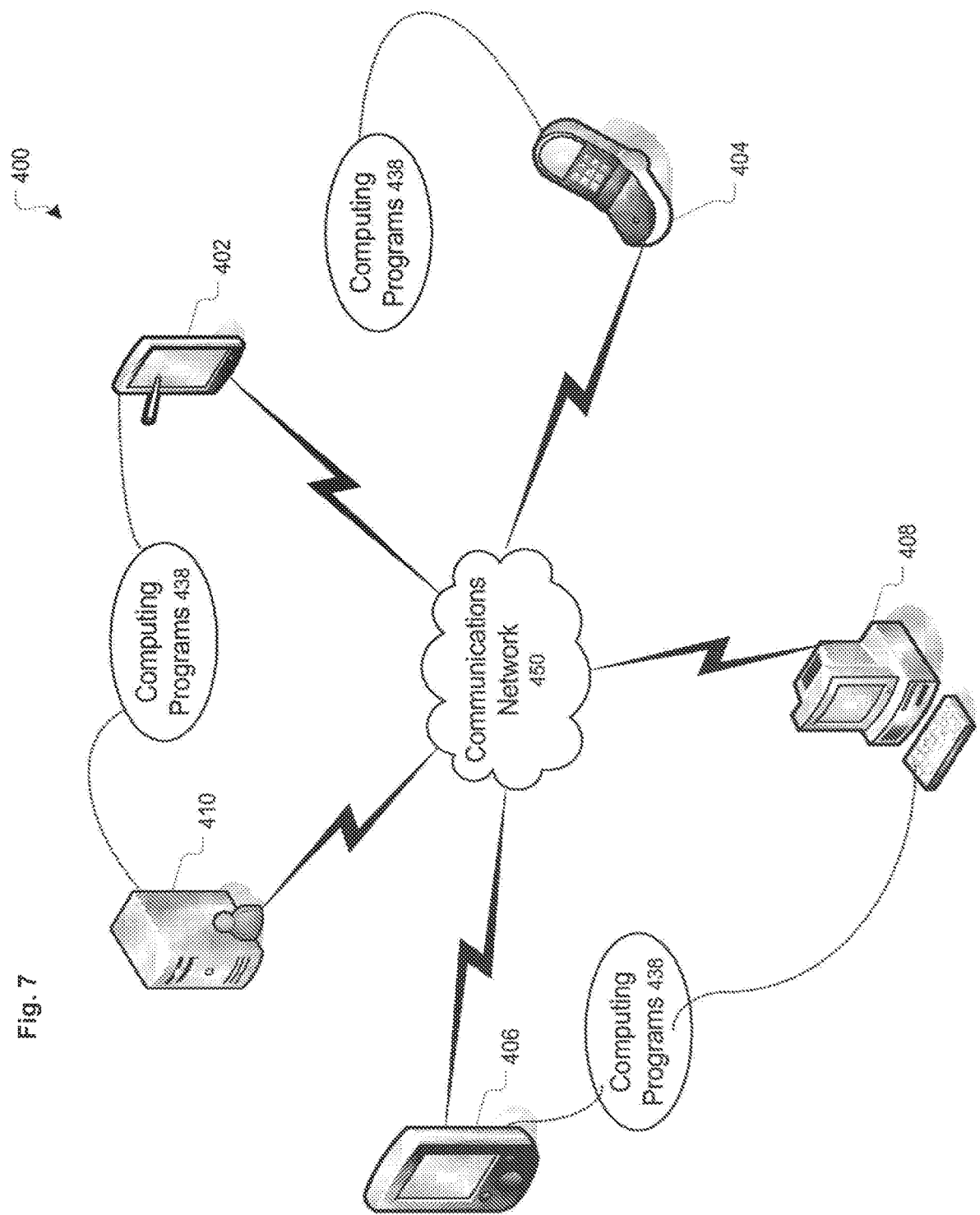
FIG. 7 shows a diagram of a system suitable for computing programs and the Internet or other wireless communication systems.

In FIG. 5-7, when the drone is wirelessly connected to a controlling computing device, a wirelessly connected ground station (with a computing device, memory and input (microphone or other input sensors)) can direct the lights to turn/on off, for the light apparatus to move and to rotate and finally for the drone to react to this stimulus or input. The movement of the drone and the lights can be independent of one another.

When not connected to a controlling computing device; hardware on the drone can have pre-built ore pre-programmed patterns for movement of the drone and activation/deactivation of the LED lights and rotation or spinning of the LED housing around the drone frame.

b. Non-Programmed Stimulus:

In FIG. 5-7, a controlling computing device (Smart Phone, tablet or laptop computer) or ground station can use the input sensor (including without limitation: a microphone or light sensor) to react to the external or non-programmed stimulus; this wirelessly connected ground station (with a computing device, memory and input (microphone or other input sensors)) can direct the lights to turn/on off, for the light apparatus to move and to rotate and/or for the drone to react to this stimulus or input.

In one preferred embodiment, the controlling computing device uses its microphone to listen to external music or other stimulus—this will turn the LED "on" or "off" or make the LED light apparatus to move or to make the drone change its position.

The apparatus also allows the human operator to change the LED light activation, sequence of activation, LED light apparatus movement and the drone movement.

c. Persistence of Vision:

In FIG. 5-7, the movement of the drone and the lights can be independent of one another; the drone can remain stationary, but the lights and light structures can be moving and actuated. Since the light mounting ring or LED housing is at the furthest part of the periphery of the drone, the light mounting structure can block or cloak the drone apparatus from view.

This invention relates to remote control device or drone, which has a combination of lights (typically LED-type lights) in a cycling motion and software that is reactive to sound to create the effect of writing words in the air and typically at nighttime against a dark sky.

Persistence of Vision can be defined as the retention of a visual image for a short period of time after the removal of the stimulus that produced it; the phenomenon that produces the illusion of movement when viewing motion pictures.

This invention refers to computing programs, applications or software, which are all synonymous and are used interchangeably. This invention can be applied to any computing device that can be connected to a communication network or the Internet via wire or wireless connection. The embodiments of the invention may be implemented by a processor-based computer system. The system includes a database for receiving and storing information from users and application software for users, among other things, determining or updating usage, lifestyle characteristics, values and a user's profile, and displaying feedback information. In accordance with the present invention, computer system operates to execute the functionality for server component. A computer system includes: a processor, a memory and disk storage. Memory stores computer program instructions and data. Processor executes the program instructions or software, and processes the data stored in memory. Disk storage stores data to be transferred to and from memory; disk storage can be used to store data that is typically stored in the database.

All these elements are interconnected by one or more buses, which allow data to be intercommunicated between the elements. Memory can be accessible by processor over a bus and includes an operating system, a program partition and a data partition. The program partition stores and allows execution by processor of program instructions that implement the functions of each respective system described herein. The data partition is accessible by processor and stores data used during the execution of program instructions.

For purposes of this application, memory and disk are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, light wave signals, radio-frequency (RF) signals and any other device or signal that can store digital information. In one embodiment, the instructions are stored on the medium in a compressed and/or encrypted format.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. The terms "a" or "an", as used herein, are defined as: "one" or "more than one." The term plurality, as used herein, is defined as: "two" or "more than two." The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any section or paragraph headings are for the organization of the application and are not intended to be limiting. Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

Incorporation by Reference: All publications, patents, and patent applications mentioned in this specification are herein incorporated by reference to the same extent as if each individual publication, patent, or patent application was specifically and individually indicated to be incorporated by reference: U.S. Pat. No. 8,667,533; US 2005/0005025; U.S. Pat. Nos. 9,162,753; 8,903,568; 7,302,316; 7,195,200; 9,134,534; 9,129,295; 9,128,281; 9,097,891; 9,097,890; 9,061,102; 9,055,226; 9,017,123; 9,014,661; 9,010,261; 8,989,053; 8,964,298; 8,857,191; 8,854,594; 8,814,691; 8,596,036; 8,549,833; 8,488,246; 8,482,589; 8,477,425; 8,472,120; 8,468,244; 8,467,133; 8,291,716; 8,109,073; 8,099,944; 7,973,658; 7,773,204; 7,750,802; 6,949,003; 6,333,726.

We claim:

1. A method comprising:
launching an aerial drone;
via a display mechanism mounted on a frame of the drone-, providing an airborne display, the display mechanism comprising:
  a dynamic display member which is, during provision of the airborne display, drivingly rotated relative to a frame of the drone such that the frame is enveloped by the dynamic display member; and
  a light emitting arrangement carried by the dynamic display member; and
using an electronic controller configured to enable control of drone movement and of the display mechanism, performing operations comprising:
  receiving a pre-defined trigger stimulus; and
  responsive to the trigger stimulus, autonomously causing the drone to produce a visual effect of writing semantic content against a visual backdrop.

2. The method of claim 1, wherein provision of the airborne display comprises providing a persistence of vision display.

3. The method of claim 2, wherein the light emitting arrangement of the display mechanism comprises an array of light emitters mounted on the dynamic display member for movement therewith.

4. The method of claim 1, wherein the visual backdrop is optically da relative to the semantic content produced via the display mechanism.

5. The method of claim 4, wherein the visual backdrop is the night sky.

6. The method of claim 1, wherein the semantic content comprises one or more words.

7. The method of claim 6, wherein the trigger stimulus for producing the visual effect comprises an ambient environmental stimulus.

8. The method of claim 7, wherein the ambient environmental stimulus comprises ambient light.

9. The method of claim 7, wherein the ambient environmental stimulus comprises ambient sound.

10. The method of claim 7, wherein the ambient environmental stimulus comprises ambient motion.

11. The method of claim 7, wherein the ambient environmental stimulus comprises ambient temperature.

12. The method of claim 6, wherein the trigger stimulus for producing the visual effect comprises a programmed light pattern.

13. The method of claim 6, wherein the trigger stimulus for producing the visual effect comprises reproduction of predefined music content.

14. The method of claim 1, wherein the trigger stimulus is received at a remote controlling device in wireless communication with the drone, instructions for producing the visual effect responsive to the trigger stimulus being communicated to the drone from the remote controlling device.

15. The method of claim 1, wherein production of the visual effect is caused at least in part by controlling drone movement.

16. The method of claim 1, wherein production of the visual effect is caused by controlled operation of the display mechanism, being independent of drone movement.

17. A drone display system comprising:
an aerial drone comprising;
a frame;
flight systems mounted on the frame to enable controlled flight of the drone; and
a display mechanism carried by the frame and configured to produce a persistence of vision display the display mechanism comprising:
a rotatable display member mounted on the frame for rotation relative to the frame, the display member being shaped and positioned such that, during rotation thereof, the frame and the flight systems are located within a volume bounded by the rotating display member;
a drive mechanism configured to drivingly rotate the display member during provision of the persistence of vision display; and
a light emitting arrangement mounted on the display member; and
an electronic controller configured to control the persistence of vision display, wherein the electronic controller is configured to perform operations comprising:
identify reception of a pre-defined trigger stimulus; and
responsive to the trigger stimulus, autonomously causing the drone to produce a visual effect of writing semantic content against a visual backdrop.

18. The drone display system of claim 17, wherein the light emitting arrangement of the display mechanism comprises an array of light emitters mounted on the rotatable display member for movement therewith.

19. The drone display system of claim 18, wherein the electronic controller comprises a mobile electronic device physically separate from the drone and configured for wireless communication with the drone to transmit instruction for producing the visual effect.

* * * * *

UNITED STATES PATENT AND TRADEMARK OFFICE
CERTIFICATE OF CORRECTION

| | | |
|---|---|---|
| PATENT NO. | : 11,987,383 B2 | Page 1 of 1 |
| APPLICATION NO. | : 17/821776 | |
| DATED | : May 21, 2024 | |
| INVENTOR(S) | : Nielsen et al. | |

It is certified that error appears in the above-identified patent and that said Letters Patent is hereby corrected as shown below:

In the Claims

In Column 6, Line 36, in Claim 1, delete "drone-," and insert --drone,-- therefor In Column 6, Line 57, in Claim 4, delete "da" and insert --dark-- therefor In Column 7, Line 29, in Claim 17, after "display", insert --,--

Signed and Sealed this
Twelfth Day of August, 2025

Coke Morgan Stewart
*Acting Director of the United States Patent and Trademark Office*